United States Patent [19]

Baney

[11] 4,450,255

[45] May 22, 1984

[54] ALUMINA-CONTAINING ORGANOSILICON RESINS

[75] Inventor: Ronald H. Baney, Midland, Mich.

[73] Assignee: Dow Corning Corporation, Midland, Mich.

[21] Appl. No.: 456,657

[22] Filed: Jan. 10, 1983

[51] Int. Cl.³ .............................................. C08K 3/22
[52] U.S. Cl. .................................... 524/430; 524/786
[58] Field of Search ............... 524/786, 789, 430, 837, 524/863; 428/450

[56] References Cited

U.S. PATENT DOCUMENTS

| | | | |
|---|---|---|---|
| 3,455,732 | 7/1969 | Hathaway | 428/450 |
| 3,640,093 | 2/1972 | Levene et al. | 65/134 |
| 3,811,918 | 5/1974 | Levene | 117/47 |
| 3,817,905 | 6/1974 | Lerner | 260/37 |
| 3,976,497 | 8/1976 | Clark | 428/450 |
| 3,986,997 | 10/1976 | Clark | 260/29.2 |
| 4,027,073 | 5/1977 | Clark | 428/412 |
| 4,177,175 | 12/1979 | Baney et al. | 428/450 |
| 4,275,118 | 6/1981 | Baney et al. | 428/412 |
| 4,308,315 | 12/1981 | Frye | 428/450 |
| 4,311,738 | 1/1982 | Chi | 428/450 |

FOREIGN PATENT DOCUMENTS 35609  9/1981  European Pat. Off.

Primary Examiner—Lewis T. Jacobs
Attorney, Agent, or Firm—R. A. Kaba

[57] ABSTRACT

What is disclosed are new alumina-containing organosilicon resins which are useful as corrosion inhibiting coatings on metal substrates. One such useful composition is a combination of 2.5 weight percent alumina; 87.1 weight percent $CH_3SiO_{3/2}$ and 10.3 weight percent colloidal silica in an aqueous-alcoholic solution at about twenty percent solids.

20 Claims, No Drawings

ALUMINA-CONTAINING ORGANOSILICON RESINS

BACKGROUND OF THE INVENTION

This invention relates to aqueous compositions which are useful for preventing or inhibiting corrosion on metal substrates.

In one aspect this invention relates to transparent protective coatings for metal substrates. In another aspect of this invention, there is disclosed resin compositions which are stable in solution wherein the oxides of aluminum and silicon do not precipitate from solution and the silicone resin matrix does not readily gell.

Prior art coating resins, for the most part, give corrosion preventing or inhibiting properties on metal substrates but these coatings often lack the abrasion resistance required in some applications.

Thus, it is an object of this invention to provide compositions which are suitable for coating metal substrates to prevent or reduce corrosion. It is a further object of this invention to provide stable, aqueous compositions.

PRIOR ART

There has been disclosed various combinations of materials that have been found useful as anticorrosion coatings on metal substrates. Such coatings, for example, are disclosed in Clark, U.S. Pat. No. 3,986,997, issued Oct. 19, 1976. There coatings consist of combinations of colloidal silica and hydrolyzed alkoxysilanes in an aqueous alcoholic medium. This disclosure mentions the use of the resins on metal substrates but does not elaborate as to the results. U.S. Pat. No. 4,027,073 is a divisional application of U.S. Pat. No. 3,986,997 and deals with essentially the same general subject matter.

U.S. Pat. No. 4,275,118, issued June 23, 1981 to Baney and Chi, deals with the use of the resins of U.S. Pat. Nos. 3,986,997 and 4,027,073 in combination with colloidal titania to produce ultraviolet light absorbing cured coatings. These coatings offer some protection to metal substrates, as the data therein show slightly better corrosion protection on metal substrates when compared to a coating similar to the inventive composition therein which did not contain titania.

Another coating composition as been disclosed in U.S. Pat. No. 3,817,905, issued June 18, 1974, which depends on the use of powdered zinc metal to enhance the effect of the silane based siloxane coating. The coatings therein consist of hydrolyzed and condensed organotrihydrocarbonoxy silanes, hydrolyzable titanium compounds of the formula $Ti(OZ)_4$ wherein Z is an aliphatic or aromatic hydrocarbon radical or a hydroxylated aliphatic or aromatic hydrocarbon radical of less than 20 carbon atoms and a particulate solid.

In U.S. Pat. Nos. 3,640,093 and 3,811,918, issued Feb. 8, 1972 and May 21, 1974 respectively, to Levene there are disclosed many combinations of partially hydrolyzed silanes in combination with metal alkoxides and/or metal salts. The specification alludes to the use of silanes of the formula $SiX_nY_{4-n}$ wherein X is, among other moieties, an alkyl radical of 1 to 6 carbon atoms and n has a value of 0, 1 or 2. This specification, however, does not show an example of the use of $RSi(OR)_3$ nor does this specification disclose the advantages of using $RSi(OR)_3$ instead of $Si(OR)_4$ as used in all of the examples therein. The major difference between Levene's disclosures and the instant invention is the fact that those prior art systems are non-aqueous, and furthermore, these systems are not aqueous colloidal systems. The discussion and the examples allude to the use of water but upon careful reading, it is quite obvious that the only water present in the prior art systems is the water for hydrolysis, which water is used up during the hydrolysis reaction to leave a solvent based, non-aqueous system.

Also, Levene's disclosures show careful, sequential, reaction schemes which give alkoxy functional oligomers, which oligomers are then reacted with the metal alkoxides of their invention. Thus, it is easy to see where the two systems differ.

Finally, in European patent application No. 0035609, (published Sept. 16, 1981) there is disclosed a coating composition which is derived from a colloidal dispersion of water insoluble metal, metal alloy or metal compounds and $RSi(OH)_3$, wherein R is an organic radical.

SUMMARY OF THE INVENTION

The present invention provides an aqueous composition which is a composition of matter comprising a dispersion of colloidal silica and colloidal aluminum oxide in a water-alcohol solution of the partial condensate of a silanol having the formula $RSi(OH)_3$ in which R is selected from the group consisting of alkyl radicals of 1 to 3 inclusive carbon atoms or the phenyl radical, at least 10 weight percent of the silanol being $CH_3Si(OH)_3$, said composition containing 1 to 45 weight percent solids, said solids consisting essentially of 1 to 60 weight percent of colloidal aluminum oxide, 1 to 50 weight percent of colloidal silica and 35 to 90 weight percent of said partial condensate.

As described above, the non-volatile solids portion of the composition is a mixture of colloidal silica, colloidal aluminum oxide, and a partial condensate of silanol.

The partial condensate of a silanol is usually obtained from the condensation of $RSi(OH)_3$, wherein R is $CH_3$.

As will be described in the examples, $RSi(OH)_3$ is generated in situ by adding the corresponding trialkoxysilanes to an acidic aqueous dispersion of colloidal silica and colloidal aluminum oxide. Trialkoxysilanes useful in this invention include such silanes as $CH_3Si(OCH_3)_3$, $CH_3Si(OC_2H_5)_3$, $C_2H_5Si(OCH_3)_3$, $C_6H_5Si(OCH_3)_3$, $C_2H_5Si(OC_2H_5)_3$ and $C_3H_7Si(OCH_3)_3$. The most preferred trialkoxysilane for this invention is $CH_3Si(OCH_3)_3$. These silanes, when contacted by water, undergo a hydrolysis reaction which liberates the alcohol corresponding to the precursor alkoxy group and results in the corresponding alkyl or arylsilanols. Part of the alcohol present in the inventive compositions is generated in this manner. Upon generation of the silanol, there is a continuous condensation of the silanol groups to form the siloxane bonds resulting in the formation of, at first, hydroxy containing oligomers and then low molecular weight hydroxy containing polymers. The condensation does not go to completion and thus the materials formed in this manner are rich in hydroxy groups on silicon atoms which results in the siloxanes being soluble in the alcohol-water solvent. Upon the curing of these siloxanes, the hydroxyl groups condense to give the silsesquioxanes, $RSiO_{3/2}$.

The colloidal silica component is an aqueous dispersion generally having a particle size in the range of 5 to 30 millimicrons in diameter. The silica dispersions are prepared by methods well known in the art and they are commercially available under such tradenames as "Ludox" and "Nalcoag." "Ludox" is manufactured by E. I. duPont de Nemours and Co., Inc. Wilmington, Del., USA. "Nalcoag" is manufactured by the Nalco Chemical Company, Oak Brook, Ill., USA. It is preferred to use colloidal silica of 10 to 20 millimicron particle size. These materials are available in both basic and acidic hydrosols. Colloidal silica is distinguished from other water dispersable forms of $SiO_2$, such as nonparticulate polysilicic acid or alkali metal silicate solutions.

The aluminum oxides useful in this invention are colloidal aluminum oxides. These materials are commercially available. One such materials is the colloidal aluminum oxide sold under the registered trademark Nalco ISJ-614. This aluminum oxide is available in a concentration of 10 weight percent in water and has an approximate particle size of 2 millimicrons. These aluminum oxide solutions generally have a pH in the acid range which means that they lend themselves quite readily to this invention. The colloidal aluminum oxides can also be prepared by methods well known in the art as, for example, from various aluminum trialkoxides.

For this invention, the colloidal silica and aluminum oxide are dispersed in a solution of the partial condensate carried in a lower aliphatic alcohol-water solution. Suitable lower aliphatic alcohols include methanol, ethanol, n-propanol, isopropanol, n-butanol, iso-butanol and tertiary butanol. Mixtures of these alcohols can be used and, indeed, are preferred for the practice of this invention. When the compositions are used for coatings it is preferred to utilize at least 50 weight percent of isopropanol in the alcohol mixture to obtain optimum adhesion of the coating. When the compositions are utilized as coatings for metal substrates, it is preferred that polar co-solvents also be used. Such polar solvents include, but are not limited to ethylene glycol monoethyletheracetate, ethyleneglycol dimethylether and the like. The solvent system should contain from about 20 to 75 weight percent alcohol to ensure solubility of the partial condensate in the composition. Optionally, one can utilize an additional water-miscible polar solvent in conjunction with the alcohol solvents described above. These solvents should be utilized in minor amounts, such as, up to 20 weight percent of the solvents. These solvents can be, for example, acetone, butylcellosolve, methylethylketone and the like.

The compositions are generally prepared by adding the trialkoxysilanes, such as $RSi(OCH_3)_3$, to the aqueous colloidal silica and colloidal aluminum oxide, generally at a pH of less than 7. If the pH of the sol is not already in the acid range, it is preferred to add acids, either organic or inorganic, to the sol to obtain a pH in the acid range in order to maintain a stable sol. It is known that at the higher pH's premature gellation tends to occur. For example, a pH of about 10.5 causes the system to gel within one hour while a pH of about 8 allows the sol to remain stable for several hours or even several days depending on the ratio of the solid components to each other, the percent nonvolatile solids, and the solvent system being used. It is preferred however to maintain the system acidic when the reactants are first contacted and hydrolysis takes place. Such an acidic pH should preferably be less than 5 as the lower pH helps maintain the stability of the composition. Thus, the acid can be added to either the silane or the colloidal substances prior to mixing the components. Acids that have been found useful for this invention are organic acids such as formic acid and acetic acid or mineral acids such as hydrochloric acid. Upon contact with water in the presence of the acid the alkoxy groups on the silane are hydrolyzed and the corresponding alcohol is generated. Additional solvent or water can be added to the composition to obtain the desired percent solids in the final composition. The mixture usually exotherms slightly owing to the hydrolysis of the alkoxysilane. The exotherm, if any, is easily controlled because by-product alcohol will eventually azeotrope and cool the reaction mass. Additional cooling may be desirable. The reaction mixture should be well mixed and allowed to age for a short time to ensure the formation of the partial condensate. The compositions at this point are clear or slightly opaque and are low in viscosity.

When the compositions are to be used as coatings, buffered latent condensation catalysts can be added to the composition so that milder curing conditions can be utilized to obtain the optimum abrasion resistance in the final coating. Alkali metal salts of carboxylic acids, such as potassium formate, are one class of such latent catalysts. The amine carboxylates and quaternary ammonium carboxylates are another such class of latent catalysts. Of course the catalysts must be soluble or at least miscible in the cosolvent system. The catalysts are latent to the extent that at room temperature they do not appreciably shorten the bath life of the composition but the composition cures upon heating. Buffered catalysts are used to avoid effects on the pH of the composition. Certain of the commercially available colloidal silica dispersions contain free alkali metal base which reacts with the organic acid during the adjustment of pH to generate the carboxylate catalysts in situ. This is particularly true when starting with a sol having a pH of 8 or 9. The compositions can be catalyzed by addition of carboxylates such as dimethylamine acetate, ethanolamine acetate, dimethylaniline formate, tetraethylammonium benzoate, sodium acetate, sodium propionate, sodium formate or benzyltrimethylammonium acetate. The amount of catalyst can be varied depending upon the desired curing condition, but at about 1.5 weight percent catalyst in the composition, the bath life is shortened and optical properties of the coating may be impaired. It is preferred to utilize from about 0.05 to 1 weight percent of the catalyst.

To provide the greatest stability in the dispersion while obtaining optimum properties in the cured product, it is preferred to utilize a composition having a pH in the range of 4 to 5 which contains 5 to 25 weight percent solids; the silica portion, being present at 5 to 28 weight percent based on the solids present in the mixture and having a particle size in the range of 5 to 30 millimicrons; the colloidal aluminum oxide being present at 2 to 25 weight percent based on total solids, and having a particle size in the range of 10 to 20 millimicrons; the partial condensate of $CH_3Si(OH)_3$ being present in an amount in the range of 70 to 90 weight percent of the total solids in a cosolvent of methanol, isopropanol and water, the alcohols representing from 30 to 60 weight percent of the cosolvent. When a catalyst is desired for a coating composition, the catalyst is preferably selected from the group consisting of sodium acetate and benzyltrimethylammonium acetate, being present in an amount in the range of 0.05 to 1 weight percent of the composition. Such a composition is relatively stable, having a bath life of approximately one month, and, when coated onto a substrate, can be cured in a relatively short time at temperatures in the range of 50°–150° C. to provide a transparent abrasion resistant, corrosion resistant, surface coating.

The coating compositions of the invention can be applied to metal substrates by conventional methods, such as flowing, spraying or dipping to form a continuous surface film. Although substrates of metal show the greatest improvement upon application of the coating, the composition can be applied to other substrates, such as wood, plastics, printed surfaces, leather, glass, ceramics and textiles. Plastic lenses, such as acrylic or polycarbonate ophthalmic lenses, can be coated with the compositions of the invention. In certain applications requiring high optical resolution, it may be desirable to filter the coating composition prior to applying it to the substrate. In applications, such as corrosion-resistant coatings on metals, the slight haziness (less than 5%) obtained by the use of certain formulations, such as those containing citric acid and sodium citrate, is not detrimental and filtration is not necessary.

By choice of proper formulation, including solvent, application conditions and pretreatment (including the use of primer) of the substrate, the coatings can be adhered to substantially all solid surfaces. A hard solvent resistant surface coating is obtained by removal of the solvent and volatile materials. The composition will air dry to a tack-free condition, but heating in the range of 50° to 150° C. is necessary to obtain condensation of residual silanols in the partial condensate. This final cure results in the formation of silsesquioxane of the formula $RSiO_{3/2}$ and greatly enhances the abrasion resistance of the coating. The coating thickness can be varied by means of the particular application technique, but coatings of about 0.5 to 20 micron preferably 2–10 micron thickness are generally utilized. Especially thin coatings can be obtained by spin coating.

The following example is illustrative and not to be construed as limiting the invention delineated in the claims. The following test method was used to evaluate the composition.

Corrosion Test

The corrosion test employed was the Copper-acetic-acid Accelerated Salt Spray (CASS) test as described in ASTM B-368. The test solution was a 5±1 weight percent sodium chloride solution with a pH of 3.2±1 (adjusted by acetic acid addition) containing 1 g of cupric chloride per gallon of test solution. A metal panel, upon which the resin of interest had been coated and cured, was inclined at about 15 degrees from vertical in the test chamber, and then exposed to a fine mist of the test solution at a temperature of 120°±2° F. for varying lengths of time. The edges of the panels were protected with waterproof tape. The density of the mist was adjusted so that 1.5±0.5 ml of solution was collected on a 80 cm² horizontal area in a one hour period. The panels were examined at varying exposure times to observe corrosion. Once corrosion began on a given sample it proceeded rapidly to cover most of the panel surface. The metal panels (3"×4.5"×0.025") used were aluminum from the Q-Panel Co., Cleveland, Ohio, USA.

EXAMPLE

A resin was prepared having a weight ratio of $Al_2O_3/CH_3SiO_{3/2}/SiO_2$ of 2.5/87.1/10.3 by mixing 0.5 gms of triisopropoxy aluminum with 8.7 gms of $CH_3Si(OCH_3)_3$; 0.2 gms of acetic acid, 9.1 gms of isopropanol; 4.0 gms of water; 1.0 gm of 2-butoxyethanol; and 1.5 gms of Nalcoag 1034A colloidal silica (34 percent solids from Nalco Chemical Co., Oak Brook, Ill. USA). These materials were shaken together in a small glass vial for several minutes to give an opaque resin composition containing about 20% by weight solids. This material was coated on an aluminum panel and cured 6 hours at 120° C. Duplicate panels were used and the panels were tested in the CASS test and compared against a non-inventive resin containing only $CH_3SiO_{3/2}$ and a second non-inventive resin consisting of 50 weight percent colloidal silica and 50 weight percent of $CH_3SiO_{3/2}$. Both non-inventive resin compositions (the $CH_3SiO_{3/2}$ and the $CH_3SiO_{3/2}/SiO_2$ resins) showed corrosion after 48 hours exposure. The inventive composition (the $Al_2O_3/CH_3SiO_{3/2}/SiO_2$ resin in the 2.5/87.1/10.3 ratio) showed corrosion only after 72 hours exposure in the CASS test.

A resin containing $Al_2O_3/CH_3SiO_{3/2}/SiO_2$ in a weight ratio of 2.6/77.1/20.3 was prepared and tested in a similar manner. The aluminum panel coated with the cured resin started to show corrosion at 48 hours in the CASS test.

That which is claimed is:

1. A composition of matter comprising colloidal aluminum oxide and colloidal silica in a water-alcohol solution of the partial condensate of a silanol having the formula $RSi(OH)_3$ in which R is selected from the group consisting of alkyl radicals of 1 to 3 inclusive carbon atoms or the phenyl radical, at least 10 weight percent of the silanol being $CH_3Si(OH)_3$, said composition containing 1 to 45 weight percent solids, said solids consisting essentially of 1 to 60 weight percent of colloidal aluminum oxide, 1 to 50 weight percent of colloidal silica and 35 to 90 weight percent of said partial condensate.

2. A composition of matter as defined in claim 1 wherein there is present at least 50 weight percent of $CH_3Si(OH)_3$ as the silanol.

3. A composition of matter as defined in claim 2 wherein there is present at least 80 weight percent of $CH_3Si(OH)_3$ as the silanol.

4. A composition of matter as defined in claim 3 wherein there is present 100 weight percent of $CH_3Si(OH)_3$ as the silanol.

5. A composition of matter as defined in claim 1 wherein there is present 5 to 25 weight percent solids.

6. A composition of matter as defined in claim 4 wherein there is present 5 to 25 weight percent solids.

7. A composition of matter as defined in claim 1 wherein said solids consist essentially of 2 to 25 weight percent colloidal aluminum oxide, 5 to 28 weight percent colloidal silica, and 70 to 90 weight percent of said partial condensate.

8. A composition of matter as defined in claim 2 wherein said solids consist essentially of 2 to 25 weight percent colloidal aluminum oxide, 5 to 28 weight percent colloidal silica, and 70 to 90 weight percent of said partial condensate.

9. A composition of matter as defined in claim 3 wherein said solids consist essentially of 2 to 25 weight percent colloidal aluminum oxide, 5 to 28 weight percent colloidal silica, and 70 to 90 weight percent of said partial condensate.

10. A composition of matter as defined in claim 4 wherein said solids consist essentially of 2 to 25 weight percent colloidal aluminum oxide, 5 to 28 weight percent colloidal silica, and 70 to 90 weight percent of said partial condensate.

11. A composition of matter as defined in claim 5 wherein said solids consist essentially of 2 to 25 weight percent colloidal aluminum oxide, 5 to 28 weight percent colloidal silica, and 70 to 90 weight percent of said partial condensate.

12. A composition of matter as defined in claim 6 wherein said solids consist essentially of 2 to 25 weight percent colloidal aluminum oxide, 5 to 28 weight percent colloidal silica, and 70 to 90 weight percent of said partial condensate.

13. A composition of matter as defined in claim 12 wherein said water-alcohol solution contains about 20 to 75 weight percent alcohol and where said alcohol consists of isopropanol and methanol.

14. A solid substrate when coated with the cured composition of claim 1.

15. A solid substrate when coated with the cured composition of claim 13.

16. A coated substrate as defined in claim 14 wherein said substrate is a metal.

17. A coated substrate as defined in claim 15 wherein said substrate is a metal.

18. A composition of matter comprising colloidal aluminum oxide and colloidal silica in a water-alcohol solution of a partial condensate of $CH_3Si(OH)_3$, said composition having a pH in the range of 4 to 5, said composition containing 5 to 25 weight percent solids, said solids consisting essentially of 2 to 25 weight percent colloidal aluminum oxide, 5 to 28 weight percent of colloidal silica, and 70 to 90 weight percent of said partial condensate, said alcohol portion of said water-alcohol solution containing methanol and isopropanol, said alcohol portion representing from 30 to 60 weight percent of the water-alcohol solution.

19. A composition of matter as defined in claim 18 said composition further comprising a catalyst selected from the group consisting of sodium acetate and benzyltrimethylammonium acetate, said catalyst being present in the range of 0.05 to 1 weight percent based on the weight of said composition.

20. A composition of matter as defined in claim 19 wherein said colloidal aluminum oxide has a particle size in the range of 10 to 20 millimicrons, and said colloidal silica has a particle size in the range of 5 to 30 millimicrons.

* * * * *